United States Patent

Ingalls, Jr.

[15] 3,702,005

[45] Oct. 31, 1972

[54] EXECUTION TIME ANALYZER

[72] Inventor: Daniel H. H. Ingalls, Jr., Menlo Park, Calif.

[73] Assignee: United Data Services, Palo Alto, Calif.

[22] Filed: May 24, 1971

[21] Appl. No.: 146,353

[52] U.S. Cl. ....................................................444/1
[51] Int. Cl. .......G06f 15/26, G06f 9/06, G06f 11/00
[58] Field of Search ........................340/172.5; 444/1

[56] References Cited

UNITED STATES PATENTS

| | | | |
|---|---|---|---|
| 3,377,471 | 4/1968 | Althaus et al. | 235/152 |
| 3,415,981 | 12/1968 | Smith et al. | 235/153 |
| 3,509,541 | 4/1970 | Gordon | 340/172.5 |
| 3,518,413 | 6/1970 | Holtey | 235/153 |
| 3,551,659 | 12/1970 | Forsythe | 444/1 |
| 3,521,239 | 7/1970 | Burrus | 340/172.5 |

OTHER PUBLICATIONS

Multiprogramming System Performance: Measurement and Analysis, H.N. Cantrell and A. L. Ellison, SJCC, 1968, pp. 213–221.

Measurement and Analysis of Large Operating Systems during Performance, D. J. Campbell and W. J. Heffner, FJCC, 1968, pp. 903–914.

*Primary Examiner*—Paul J. Henon
*Assistant Examiner*—Jan E. Rhoads
*Attorney*—Warren M. Becker and Jerald E. Rosenblum

[57] ABSTRACT

The Fortran Execution Time Estimator (FETE) for software monitoring and performance evaluation is a three-step process. The first step accepts FORTRAN IV source programs and produces an edited file with counters and flags. The second step executes the edited file. After execution, the third step re-reads the edited file and correlates it with the final counter values to provide a listing. The executable statements are collected and appear in the listing beside the exact number of executions and approximate computation time. The number of true branches of logical IFs are tallied on the right of the listing, and subtotals appear at the end of each routine for which an execution-time profile is made.

9 Claims, 3 Drawing Figures

INVENTOR.
DANIEL H. H. INGALLS, JR.
BY Warren M Becker
J Rosenblum
ATTORNEYS

EXECUTION TIME ANALYZER

BACKGROUND OF THE INVENTION

To live cheaply, a list may be made of how much money is spent on each thing every day. This enumeration will quickly reveal the principal areas of waste. The same method works for saving computer time. Originally, one had to put his own timers and counters into a program to determine the distribution of time spent in each part. Recently several automated systems have been proposed which either insert counters automatically or interrupt the program during its execution to produce the tallies. No provision is made in these systems, however, for an execution-time profile comprising a cost breakdown for each statement together with a printout of the costs in conjunction with the statement.

Execution-time profiles are of value to three main areas of programming: improving old programs, writing new programs and educating programmers. In improvement of old programs it most often happens that the programmer initially does not know what the program does. Even when improving one's own program, much of the original scheme has probably faded from memory and the comments are often of little help. The results of a study show that from a typical program, approximately 3% of the code constitutes 50% of the execution time. In some sense, then, if a naive programmer sets out to improve a program, he will work 30 times more effectively if he has a FETE (or similar) listing in front of him. Two words describe the programmers observed looking at their FETE runs: focussed attention. The human mind's most powerful tool is selective attention, but the selection requires an awareness about the environment which in this situation is furnished by a source-level presentation of execution time distribution.

Since FETE became operational, I have changed my own approach to programming. My three steps to creating a program used to be:

1. Think how I want to do it
2. Write it up in the best way
3. Debug it

The numbers at the left are not to indicate order but are an estimate of how long the steps take. My new recipe is more like the following:

1. Think how I want to do it
1. Write it up in the quickest way
1. Debug it
0. Get a FETE listing
1. Rewrite and debug the important parts The writing time is less because it can be assumed that none of the program needs to be efficient (remember that only 3% does). The debugging time is less because the code used to debug is really simple. The time to rewrite the important sections is low because although one tries to write very efficient code, there is very little which needs this attention. The result is a program written in two-thirds the time, and which is much easier to understand because it is simply written. On top of that, it probably runs faster, because the inner loops have been specially written. The first run of FETE upon inself led to a twofold increase in speed!

The instructional value of execution-time awareness must be great. For one thing, the programmer will learn to recognize inefficient algorithms. Moreover, the reinforcements from FETE enhance the aesthetic enjoyment of writing a good program. The nicest reward which came from finishing FETE was being able to run it on itself, in part because it was fun to improve, and part because it was clear when the job was finished. Many people point out that good programs come from good algorithms. The implication is often that only skilled programmers are capable of choosing good algorithms. My feeling is that much mediocre programming comes about only because the programmer is lost in his program and can't see what is important. He would choose better methods if he had better perspective, and that is exactly what FETE and similar systems can provide.

The current approach to higher level languages aims at liberating the programmer from petty (hardware and archaic software) considerations. This is a laudable goal, but one must not include computation as a petty consideration. APL is a good example of a liberating language, but it also masks the huge amount of processing behind much of its vocabulary. The risk of conciseness is that a bad algorithm may fit at one line, and never be noticed. Incorporation of execution-time tallies into the new languages offers a solution to this problem, by maintaining the awareness of the programmer at the same level as the power of the language. Those contemplating new compilers would do well to include execution time profiles as an option for users.

SUMMARY OF THE INVENTION

A principal object of the present invention is a program for generating execution-time profiles. More particularly, it is a program which is essentially a three-step procedure for use in a general purpose computer for improving the efficiency of FORTRAN IV programs with a minimum expenditure in time and energy.

The Fortran Execution Time Extimator Program (FETE) in the first step edits an original Fortran IV source file. It inserts counters in the program, provides flags for later use, and estimates statement costs. A modified or edited source file results. Using a Fortran compiler and loader in a conventional manner, the computer in the second step executes the modified source file, thus incrementing the counters.

Upon completion of the run of the modified source file, FETE, in the third step, analyzes the results and, guided by the flags in the modified source file, correlates counter values with statements and costs and prints out the results. The listing comprises the original FORTRAN statements correlated with the tallies of execution frequency, tallies of execution timing and tallies of IF branching.

These and other objects,features and advantages of the present invention will become apparent from the following detailed description and accompanying drawings.

DETAILED DESCRIPTION

Figure 1:
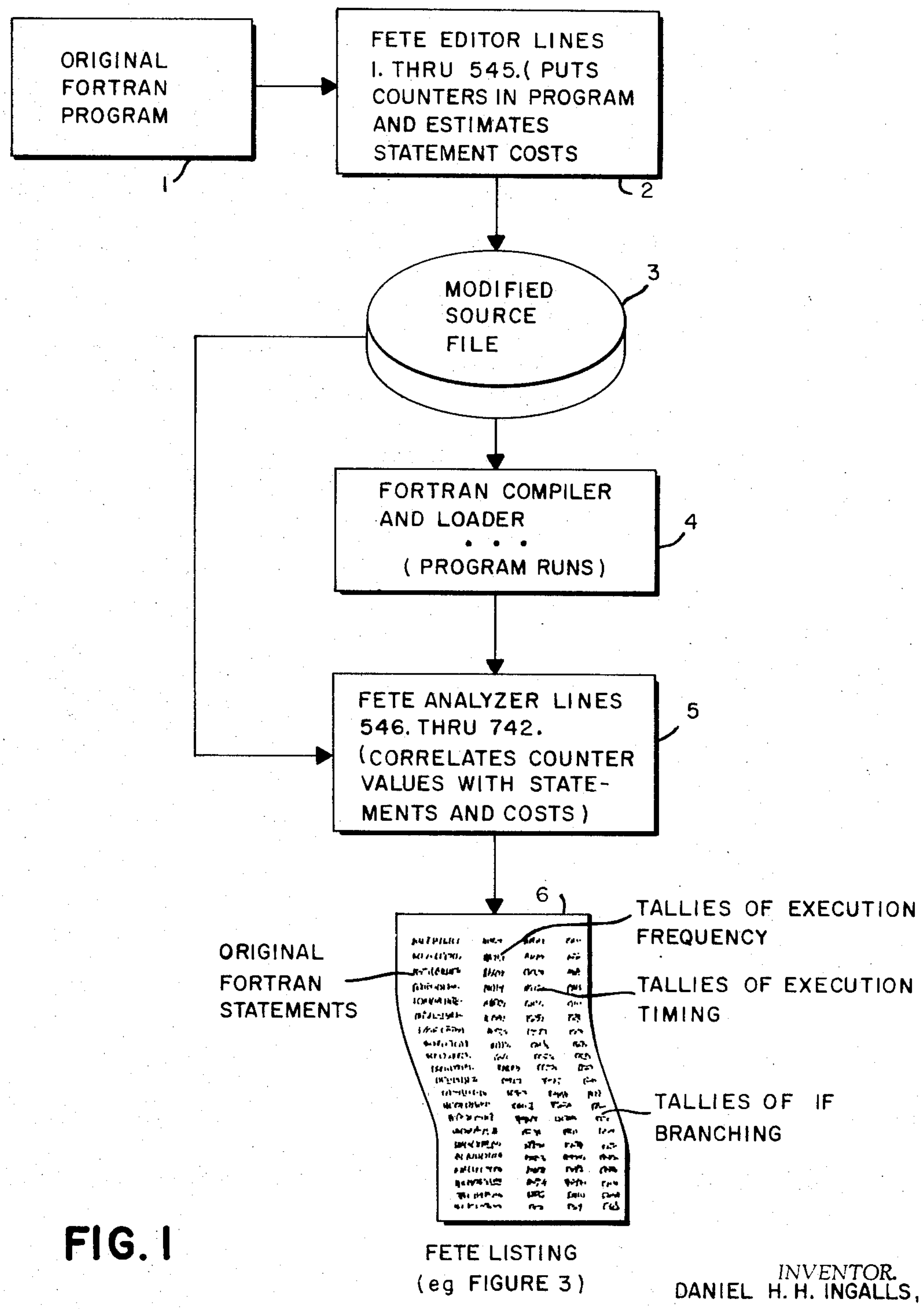
FIG. 1 is a diagrammatic flow diagram of an overall system using FETE.

Referring to FIG. 1, there is provided for analysis by FETE an original FORTRAN program or source file 1. The original FORTRAN program comprises a conventional file or a deck of cards as is typically used as an input to a FORTRAN compiler. An editing portion of FETE or FETE editor 2, edits the original FORTRAN program. The FETE editor 2 is a program which modifies the original FORTRAN program by editing in counters and flags necessary for the tallying process of FETE. A result of the editing operation is a modified source file 3. Modified source file 3 is a file which will produce the same results as the original FORTRAN program. However, it will also cause execution frequency to be tallied for each segment of the program, owing to the presence of counters inserted by the FETE editor 2.

A FORTRAN compiler and loader 4, a conventional part of most computer systems, translates the modified FORTRAN source file 3 into machine code, loads the code into memory and initiates execution of the code. For analyzing the results of the program there is provided in FETE an analyzing portion or FETE analyzer 5. The FETE analyzer 5 is a routine to correlate the execution counts with the statements of the original FORTRAN program 1. It accomplishes the task by reading the modified source file 3. The flags contained in that file allow the determination of which counter tally relates to each original program statement, and also roughly how much computation is involved in each statement. As it proceeds, the analyzer prints a listing (or creates a file) 6 in which the tallies and time estimates are presented line by line beside the original program statements to which they are connected.

In Tables 1, 2 and 3 below there is provided an example of an original FORTRAN program, a modified source file and a FETE listing in which only executable statements are displayed corresponding to items 1, 3 and 6, respectively, of FIG. 1.

TABLE 1

Original FORTRAN File

| | |
|---|---|
| C | PRINT OUT FIRST 100 PRIMES |
| | INTEGER PRIMES (100) |
| | PRIMES (1) = 2 |
| | PRIMES (2) = 3 |
| | N = 3 |
| | DO 30 INDEX =3,100 |
| C | GET NEXT (ODD) CANDIDATE |
| 10 | N = N + 2 |
| C | RUN THROUGH POSSIBLE (PRIME) DIVISORS |
| | K = 2 |
| 20 | IQUOTN = N/PRIMES(K) |
| | IF(PRIMES(K)*IQUOTN.EQ.N) GO TO 10 |
| | IF(IQUOTN.LE.PRIMES(K)) GO TO 30 |
| | K = K +1 |
| | GO TO 20 |
| | PRIMES(INDEX) = N |
| | WRITE(6,40) PRIMES |
| 40 | FORMAT('1 THE FIRST 100 PRIMES ARE: ',13(/8I10)) |
| | STOP |
| | END |

TABLE 2

Modified Source File

| | | | i | j | k | l |
|---|---|---|---|---|---|---|
| a) | | COMMON/KOUNT2/ KOUNT5(2000), KOUNT3 | | 0 | | |
| | | INTEGER PRIMES (100) | 0 | 27 | 1 | 0 |
| | | PRIMES (1) = 2 | 1 | 1 | 1 | 2 |
| | | PRIMES (2) = 3 | 1 | 1 | 1 | 2 |
| | | N = 3 | 1 | 1 | 1 | 1 |
| b) | | DO 83294 KOUNT3 = 1,2000 | | 0 | | |
| | 83294 | KOUNT5 (KOUNT3)=0 | | 0 | | |
| c) | | KOUNT5 ( 1)=KOUNT5( 1)+1 | | 5 | | |
| | | DO 30 INDEX=3,100 | 1 | 2 | 2 | 2 |
| d) | | KOUNT5( 2)=KOUNT5( 2)+1 | | 5 | | |
| e) | 10 | KOUNT5( 3)=KOUNT5( 3)+1 | 6 | 1 | 2 | 2 |
| | | N = N + 2 | 1 | 1 | 2 | 2 |
| | | K = 2 | 1 | 1 | 2 | 1 |
| | 20 | KOUNT5( 4)=KOUNT5( 4)+1 | 6 | 1 | 2 | 9 |
| | | IQUOTN = N/PRIMES(K) | 1 | 1 | 2 | 9 |
| f) | | IF(PRIMES(K)*IQUOTN.EQ.N) | | | | |
| | | KOUNT5( 5)=KOUNT5( 5)+1 | | 5 | | |
| | | IF (PRIMES(K)*IQUOTN.EQ.N) | | | | |
| | | GO TO 10 | 3 | 4 | 2 | 8 |
| | | IF (IQUOTN.LE.PRIMES(K)) | | | | |
| | | KOUNT5( 6)=KOUNT5( 6)+1 | | 5 | | |
| | | IF (IQUOTN.LE.PRIMES(K)) | | | | |
| | | GO TO 30 | 3 | 4 | 2 | 3 |
| | | K = K +1 | 1 | 1 | 2 | 2 |
| GO TO 20 | | | 1 | 4 | 2 | 1 |
| g) | 30 | PRIMES(INDEX) = N | 2 | 1 | 2 | 3 |
| | | KOUNT5( 7)=KOUNT5( 7)+1 | | 5 | | |
| | | WRITE(6,40) PRIMES | 1 | 18 | 1 | 506 |
| | 40 | FORMAT('1 THE FIRST 100 PRIMES ARE: ',13(/8I10)) | 0 | 33 | 1 | 506 |
| h) | | CALL KOUNT1 | | 0 | | |
| | | STOP | 1 | 7 | 1 | 0 |
| | | END | 7 | 21 | 0 | 3 |

TABLE 3

FETE Listing

| EXECUTABLE STATEMENTS | EXECUTIONS | COST | TRUE |
|---|---|---|---|
| PRIMES (1) = 2 | 1 | 2 | |
| PRIMES (2) = 3 | 1 | 2 | |
| N = 3 | 1 | 1 | |
| DO 30 INDEX = 3,100 | 1 | 2 | |
| 10 N = N + 2 | 269 | 538 | |
| K = 2 | 269 | 269 | |
| 20 IQUOTN = N/ PRIMES(K) | 911 | 8199 | |
| IF(PRIMES (K)*IQUOTN . EQ.N) GO TO 10 | 911 | 7459 | 171 |
| IF(IQUOTN. LE.PRIMES (K)) GO TO 30 | 740 | 2318 | 98 |
| K = K + 1 | 642 | 1284 | |
| GO TO 20 | 642 | 642 | |
| 30 PRIMES (INDEX) = N | 98 | 294 | |
| WRITE(6,40) PRIMES | 1 | 506 | |
| STOP | 1 | 0 | |
| SUBTOTALS FOR THIS ROUTINE | 4757 | 21516 | |
| **** 16 EXECUTABLE, 2 NON-EX, | | 3 COMMENTS: | |
| TOTALS: | 4757 | 21516 | |

As summarized above, FETE is a three-step procedure. Since the second step runs as a normal FORTRAN job it entails no effort other than file organization. The bulk of the following description is, therefore, devoted to describing the details of the first and third phases of FETE.

Table 1 is provided to illustrate a FORTRAN IV program or source file for determining and printing out the first one hundred primes. FETE, the program of the present invention, edits and analyzes the program of Table 1 to provide the modified source file and listing of Tables 2 and 3.

Referring to Table 2, there is shown the modified source file 3 produced from the program of Table 1 during FETE's first step. The annotations (a) through (l) referred to immediately hereinafter refer to the lines and columns of Table 2 above. The first insertion (a) is a typical labelled common declaration for the counter array. The dimension 2,000 directs the computer to set aside 2,000 summary locations for the counters used by FETE. Two thousand locations are considered adequate for most programs up to 6,000 statements in length. The common declaration is inserted in all routines immediately following any SUBROUTINE, FUNCTION, or IMPLICIT statements, or in their absence, as in our example, it appears as the first statement. The names K0UNT1, K0UNT3, etc., are unlikely to conflict with users' names as they are spelled with a zero, not an 0. Initialization of the counters (b) occurs immediately before the first "noticeably" executable statement, "DO 30" in our example. FETE makes no attempt to recognize statement functions because of the difficulty of inserting counters for them, and hence must assume that the first arithmetic statements might have been statement functions. The first counter must then be inserted (c) to tally the executions of any preceding arithmetic statements. From there on, counters need only be inserted where control branches and where logical Ifs occur. For instance, we need counters immediately after a DO statement (d) because there is an implied loop entry at that point. Now with reference to Table 1, note what became of statement 10. FETE removes each statement label (except those which terminate DO-loops), and attaches it to an inserted counter(e). In this way, each time control branches into the main line of code, the extra executions will be recorded. If in a typical routine, a CONTINUE statement is stripped of its label in this way, the label will be deleted from the source, and a flag set in the counter so that it may be recreated for the final listing.

When FETE encounters a logical IF, it first strips off the target statement and replaces it by a counter. The resulting IF statement is then inserted (f) above the original. Thus, even if the original IF would cause a branch out of line, the fact that the branch was taken will be recorded by the counter. Usually the editing of IFs can be done on one line, as is the case in our example; however, when the IF clause is too long (typically less than 5% of the time), appropriate continuation cards are generated for the IF-counter. Most of the time, FETE does not insert counters after IF statements. Almost all target statements of IFs are either arithmetic or GO TOs. In the former case, the mainline execution count will be unchanged; in the latter it must be decreased by the value of the IF counter (i.e., the number of branches out of line). The analysis routine in step three which reads the counters can determine which was the case by examining the sequence-column flags hereinafter described. In indeterminate cases, such as a CALL with multiple returns, or a READ with ERR return, FETE inserts a counter after the IF to be safe.

Figure 2:
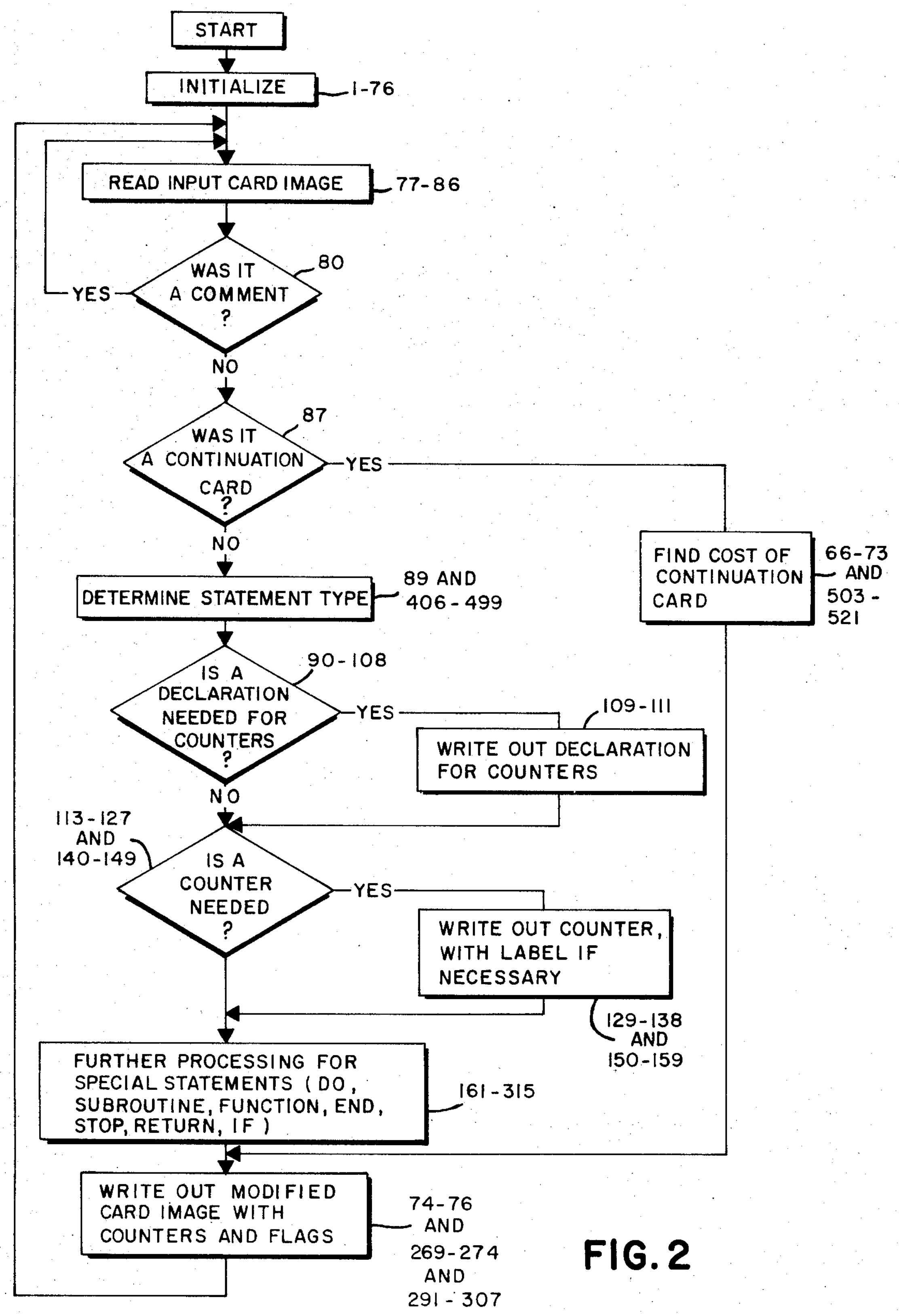
FIG. 2 is a flow diagram of the editing portion of FETE.

Note (g) of FIG. 2 indicates a labelled statement which has not been modified in the manner of the other labeled statements. The terminal statement of a DO-loop presents a special problem to execution tallying. On the one hand we need a labelled counter before the statement in question for the tallies and so that transfers to the label will work properly; yet that would end the DO-loop above the statement originally labelled, and exclude it from the loop. Fortunately, though, we have enough extra information to solve the dilemma. The following simplified code segment illustrates the situation:

```
K (n)=K(n)+1
DO 10 I=I1,I2
K(n+1)=K(n+1)+1
10 P(I) = F
K(n+2)=K(n+2)+1
```

One thing we know for sure: $K(n+1)$ would have the correct tally for statement 10 if there were no branches out of the DO-loop. In fact, if we could subtract from $K(n+1)$ the number of branches out of the DO-loop, then we would have the answer. Now we note that the only way for $K(n)$ to be stepped without $K(n+2)$ increasing also is if there is a branch out of the loop. Thus we obtain our result that P(I)=F must have been executed $K(n+1)-K(n)+K(n+2)$ times.

When FETE encounters a STOP (or CALL EXIT or RETURN in the main program) it inserts a call (h) to the analysis routine (K0UNT1) in step three which goes back to correlate the modified source with the counter contents. Provision is also made for termination in an IF statement such as

IF (NCARD.EQ.LAST) STOP

Here the IF clause will be repeated three times; once with a counter, once with the CALL, and a last time with the STOP.

FETE handles SUBROUTINES and FUNCTIONS in the same manner as the MAIN, except that no counter initialization is inserted and a RETURN is not treated as a STOP. We move on now to deal with the sequence-column flags before summarizing the task of the analysis routine.

The sequence column fields of Table 2 are denoted *i*, *j*, *k*, *l*. Field *j* is a two digit code for the statement type (1= arithmetic, 2=DO, 3=IF, 4=GO TO, etc.). Since logical IFs are flagged in the *i*-field, their *j*-field is used to give the classification of the target statement. The *k*-field is a two-digit index of the depth of DO-nesting. Actually, this value does not increase with every DO encountered, but only when the DO refers to an end-label not yet used in previous DOs. The convention economizes on stack space, and yet gives enough information to the analysis routine. The 1-field gives the "-cost" of each statement, and is responsible for the 'dirty' in FETE's designation as a quick-and-dirty system. FETE determines cost by a linear scan of each executable statement which looks for operators, parentheses, etc., charging a reasonable fee for each. Another base cost is derived from the statement type, and the operator cost is then added on. In statements such as WRITE or FUNCTION, a further charge is levied for each comma encountered to reflect the extra argument overhead. At each left-parenthesis a check is made to see if the preceding identifier as a FORTRAN internal function name, and if so, the appropriate cost is added on from Table 4.

Most of the cost of a CALL is put into the corresponding SUBROUTINE statement. The justification is a human engineering consideration. The reason for showing the cost of a CALL is to suggest to a programmer the possibility of writing his subrouting in line to save time. To evaluate that suggestion, the programmer really wants to see the total cost of the subrouting linkage in one number, rather than in five calls scattered throughout his program. The same convention is especially appropriate for FUNCTION statements, because FETE's lack of a symbol table precludes detection of the implied calls, yet the tallies in the function code will be correct. Future versions of FETE will use a more elegant cost assessment, but this crude scheme has been remarkably successful. The source editing is performed in one pass without scratch files, and takes roughly one-fifth as long as the FORTRAN compilation.

The analysis routine, which comprises FETE's third phase, is linked in during the FORTRAN step, so that it may be called just before the program would have come to a STOP. This phase rereads the edited file and correlates the executable statements with the counter values and prints the FETE listing in one last pass.

The *i*-field of the sequence-column flags described in Table 4 below was originally intended as a coded column of useful facts for the analysis routine. However, as that routine took shape, it became clear that these numbers worked as operation codes for an analysis-machine. This is one of several instances where I have found new insight into a problem by considering its data-to-program relationship.

TABLE 4

Order code of the analysis machine. Initial conditions are ISFRST=YES and IK=1.

| *i*-field | operation | Comment |
|---|---|---|
| 0 | If J not blank then tally static Set ISEXEC=NO. | Not executable or not from original source. |
| 1 | Dynamic count is KOUNT5(IK); tally static, dynamic, and by cost; Set ISEXEC=YES; Print with counts; if *k*=2, push 0 onto DO-stack if new DO-label, then add KOUNT5(IK+1)-KOUNT5(IK) to top of DO-stack; if *k*=21 (END), then print subtotals and set ISFRST=YES. | Executable statement |
| 2 | Dynamic count is KOUNT5(IK+1)+ top of DO-stack; pop DO-stack; proceed otherwise as when *i*=1. | End of a DO-loop |
| 3 | IF count is KOUNT5(IK−1); TRUE count is KOUNT5(IK); if *j*=1 then move KOUNT5(IK−1) into KOUNT5(IK); if *j*=4 then move KOUNT6(IK−1)-KOUNT5(IK) into KOUNT5(IK); Proceed otherwise as when *i*=1. | Logical IF |
| 4 | If ISEXEC print with counts. | Continuation card |
| 5 | If not ISFRST, IK=IK+1; set ISFRST=NO. | Inserted counter |
| 6 | Save label and append to next line with *i*=4; If *j*=12, create CONTINUE statement as next line; proceed as when *i*=5. | Labelled counter |

Table 4 – Continued

| *i*-field | operation | Comment |
|---|---|---|
| 7 | Print END followed by subtotals and totals; Number source comments is 1000+*k*+1; Print table of statistics; RETURN. | Last statement of program |

As the analysis routine proceeds through the file, it maintains subtotals and totals of executions and cost and prints these for the programmer to use for judging relative importance of different parts of the listing. Percentage cost is not given for two reasons. First is the necessary for an extra pass through the source file (or a smaller file with static costs only). Second is the observation that people using FETE simply scan the cost column visually for the number of digits, a process for which FETE's large integers are ideally suited. A simple statistic which is included is the running total of the executions and costs squared. From these and the normal totals, the r.m.s. values may be compared with the mean values to give an idea of how "peaky" the execution and cost are.

Figure 3:
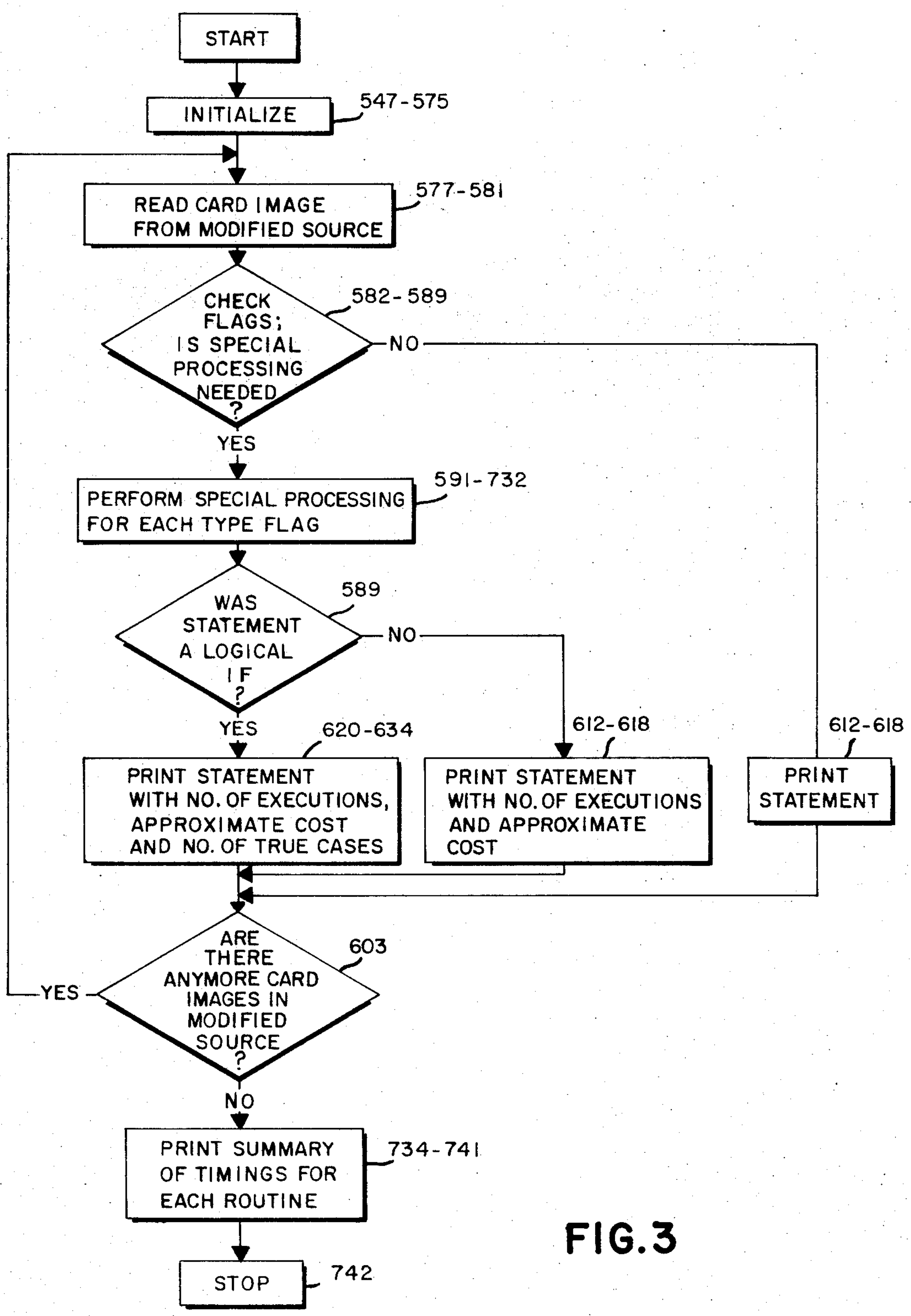
FIG. 3 is a flow diagram of the analyzing portion of FETE.

A detailed program of the present invention is included in the appendix hereto and is considered with reference to FIGS. 2, 3.

Referring to FIGS. 2,3 and the appendix, each statement of the program is identified sequentially by numbered lines 1–742. The FETE editor 2 comprises line 1–546. The FETE analyzer 5 comprises lines 547–742.

Referring to FIG. 2, for example, FETE editor 2 comprises a series of initializing statements 1–76 corresponding to lines 1–76 in the program in the appendix. Statements 1–76 are followed by a series of statements 77–86 for reading the input card image. As is apparent, the remainder of the program is understood by simply referring to the lines of the program in the appendix associated with each of the blocks in flow diagrams FIG. 2,3.

The FETE approach to determining actual timing is a very course one, but has proved to be 90% effective in giving programmers what they want. Other workers have developed compilers incorporating the whole execution-timing process, and that is obviously the proper approach. With the symbol table available, the timing of input-output statements can be assessed, the code-generator can give exact timings for the other statements and the insertion of counters is efficient, both in placement and in code generated. Furthermore, the compiler's run-time routines can usually pick up the pieces after a program dies or runs out of time, and the FETE enumeration of executions would be informative in such cases.

The system described above is a specific implementation of the principle of execution time estimation applied to the computer language FORTRAN. The principle of presenting such information is a broad one, however, and is applicable to most other languages in which computer programs are currently within such as COBOL, ALGOL, and PL/I.

APPENDIX

```
1.......      COMMON LASTCO
2.......      LOGICAL* 1 ICARD(1513),LDIGIT(10)
3.......      LOGICAL*1 ISTATN(6),KCARD(73),JCARD(72)
4.......      INTEGER IDONUM(20)
5.......      REAL*8 FASTIO(10),CRDS8(9),BLNKS8/'     '/
6.......      EQUIVALENCE (ICARD(1),CRDS8(1),FASTIO(1))
7.......      EQUIVALENCE(ICARD(1441),JCARD(1),KCARD(1))
8.......      DATA  LDIGIT   /'0','1','2','3','4','5','6','7','8','9'
9.......      LOGICAL*1 LBLANK/' '/,LPAR/'('/,LRPAR/')'/,LZERO/'0'/
10......      LOGICAL*1 LC/'C'/,LSTAR/'*'/,LDOLAR/'$'/
```

APPENDIX—Continued

```
    1000   FORMAT(10A8)
    1010   FORMAT(72A1,2X,I2,I4)
    1015   FORMAT( 9AB,2X,I2,I4)
    1020   FORMAT(6X,'DO 83294 K0UNT3=1,',I4,T75,'1'/
         *    '83294 KCONT5(K0UNT3)=0',T75,'-1')
    1040   FORMAT('***-NO END AT END')
    1050   FORMAT('***-BAD LABEL')
    1060   FORMAT('***-DO STRUCTURE: ',I3)
    1070   FORMAT('***-LONG IF: ',3I3)
    1080   FORMAT('***-PARENTHESES: ',2I3)
    1085   FORMAT('***-COUNTER ALLOCATION EXCEDED')
    1090   FORMAT(6X,'INTEGER K0UNT5(',I4,'),K0UNT3',T75,'-1'/
         *    6X,'COMMON/K0UNT2/K0UNT3,K0UNT5',T75,'-1')
    1100   FORMAT(6A1,'K0UNT5(',I4,')=K0UNT5('I4,')+1',T76,'8',I4)
    1110   FORMAT(5X,1A1,'CALL K0UNT1,T75,'-')
    1120   FORMAT(45A1,'K0UNT5(',I4,')=K0UNT5(',I4,')+1     8',I4)
    1130   FORMAT(45A1,' CALL K0UNT1')
C                                                          *****
C          INSERT=1 TO INSERT A COUNTER BEFORE NEXT STATEMENT;=0 ELSE
C          ISUBR=1 IF WE ARE IN A SUBROUTINE OR FUNCTION;=0 ELSE
C          INSCOM=1 IF WE HAVE ALREADY INSERTED COMMON DECL; =0 ELSE
C          IFNDEV=1 IF WE MAY STILL BE IN FN DEF SECTION;=0 ELSE
C          IFLAG:               =-1 FETE STUFF        =0 NON-EXECUTABLE
C          =1 EXECUTABLE        =2 CONTINUATION       =3 DO STATEMENT
C          =4 END OF DO         =5 LOGICAL IF         =6 FUNC OR SUBR
C          =7 END STMT          =8 COUNTER            =9 LAST STATEMENT
           ISRCOT=15
           ISRCIN=5
           NCTRS=2000
           ISAVE=0
           ICLASS=0
           INSCOM=0
           ISUBR=0
           INSERT=0
           INDX=0
           KOST=0
           IFNDEF=1
           IDOCNT=1
           IDONUM(1)=-1
           GO TO 60
C
C          ***** SPECIAL STUFF AT END OF SOURCE *****
      10   WRITE(ISRCOT,1040)
      20   IFLAG=9
           IF(INDX.GT.NCTRS) WRITE(ISRCOT,1085)
           WRITE(ISPCOT,1015)CRD8,IFLAG
           IF(JCARD(1).NE.LDOLAR) GO TO 25
C          COPY WATFOR DATA CARDS
           WRITE(ISRCUT,1010) JCARD
      22   READ(ISRCIN, 1000, END=25) FASTIO
           WRITE (ISRCOT, 1000) FASTIO
           GO TO 22
      25   ENDFILE ISRCUT
           STOP
C
C          CONTINUATION CARD LOOP
      40   ISAVE=IFLAG
           IFLAG=2
           KOST=0
           IF(ICLASS.EQ.1) CALL FCOST(ICARD,KOST,1513)
           WRITE(ISRCUT,1015)CRD8,IFLAG,KOST
           IFLAG=ISAVE
           GO TO 60
C          OTHER CARDS LOOP
      50   WRITE(ISRCOT,1015) CRD8,IFLAG,KOST
C
C          ***** BASIC EDITING BEGINS HERE *****
      60   READ(ISRCIN,1015,END=10)CRD8
      70   CONTINUE
           IF(ICARD(1),EQ.LC) GO TO 60
           IF(ICARD(1),EQ.LDOLAR) GO TO 89
C          ** FIND LAST COLUMN (NEAREST MULT OF 8)
74         LASTCO=72
           DO 75 I=1,8
           IF(CRD8(10-I).NE.BLNK8) GO TO 76
75         LASTCO=LASTCO-8
76         IF(ICARD(6),ME.LBLANK, AND. ICARD(6).NE.LZERO) GO TO 40
C          DETERMINE STATEMENT TYPE
      80   CALL FCLAS(ICARD,ICLASS,KOST,1513)
           IF(ICLASS,GT.22) GO TO 90
C          EXECUTABLE STATEMENTS HERE
           IFLAG=1
           IF(INSCOM) 110,110,120
C          NON-EXECUTABLES
      89   ICLASS=37
      90   IFLAG=0
           IF(ICLASS.LT.34) GO TO 100
           IF(ICLASS.GE.37) GO TO 50
           IF(ICLASS.NE.34) GO TO 100
           INDX=INDX+1
           IFLAG=6
           IFNDEF=0
           INSCOM=1
     100   CONTINUE
           IF(INSCOM)50,110,50
C
C          ** INSERT COMMON DECLARATION FOR COUNTERS
     110   IF(ICLASS.EQ.19 .OR. ICLASS.EQ.20) GO TO 240
           WRITE(ISRCOT,1090)NCTRS
           INSCOM=1
           IF(ICLASS.GE.23) GO TO 50
C
C          *** TEST FOR STATEMENT NUMBERS
     120   CONTINUE
           NMBR=-1
           DO 150 J=1,5
           IF(ICARD(J).EQ.LBLANK) GO TO 150
           IF(NMBR.LT.0) NMBR=0
           DO 130 I=1, 10
           IF(ICARD(J).EQ.LDIGIT(I) GO TO 140
```

APPENDIX – Continued

```
      130 CONTINUE
          WRITE(ISRCOT, 1050)
          GO TO 150
      140 NMBR=NMBR*10+1-1
      150 CONTINUE
          IF(INSERT.EQ.1) GO TO 190
          IF(NMBR,LT.0) GO TO 170
C
C         ** INSERT (INITIALIZATION AND) COUNTERS
      160 IF(FNDEF) 180,200,180
      170 IF(ICLASS,EQ.1) GO TO 50
          IF(IFNDEF.EQ.0) GO TO 240
      180 IF(ISUBP.EQ.0) WRITE(ISRCOT, 1020)NCTRS
          IFNDEF=0
      190 INDX=MINO(NCTRS,INDX+1)
          WRITE(ISRCOT,1100) (LBLANK, 1=1,6), INDX,INDX
          INSERT=0
          IF(NMBR.LT.0) GO TO 240
C
C         *** NUMBERED STATEMENTS HERE
      200 IF(IDONUM(IDOCNT)-NMBR)220,210,220
C         ** MATCHES A DO NUMBER
      210 IFLAG=4
          IF(ICLASS.EQ.3) KOST=1
C         INCREMENT KOST TO REFLECT DO OVERHEAD
          KOST=KOST+1
          IDOCNT=IDOCNT-1
          IF(IDOCNT.LI.1) WRITE(ISRCOT,1060) IDOCNT
          GO TO 310
C         ** REMOVE STATEMENT LABEL AND PUT IT ON AN INSERT
      220 DO 230 I=1,6
          ISTATN(I)=ICARD(I)
          ICARD(I)=LBLANK
      230 CONTINUE
          LABFLG=-1
          IF(ICLASS.EQ.12) LABFLG=-2
          INDX=MINC(NCTRS,INDX+1)
          WRITE(ISRCOT,1100) ISTATN, INDX, INDX, LABFLG
          IF (ICLASS.EQ.12) GO TO 60
C
C         *** THE BIG SWITCH
C                        ARIT DO IF GOTO EXIT CALL STOP PAUS RETU ASSI
      240 GO   TO     (     50, 250, 380, 50, 370, 310, 370, 50, 360, 50,
C         BACK CONT ENDF PRIN PUNC READ REWI WRIT SUER FUNC END ENTR
          * 50, 50, 50, 50, 50, 310, 50, 50, 50, 320, 330, 330, 315), I CLASS
C
C         *** DO STATEMENTS/STORE END LABEL
      250 INON=0
          IFLAG=3
          NMBR=0
          DO 280 1=7,LASTCO
          IF(ICARD(I).EQ.LBLANK) GO TO 280
          DO 260 J=1, 10
          IF(ICARD(I).EQ.LDIGIT(J)) GO TO 270
      260 CONTINUE
          INON=INON+1
          IF(3-INON)290,290,280
      270 NMBR=NMBR*10+J-1
      280 CONTINUE
      290 IF(NMBR,EQ.IDONUM(IDOC IT)) GO TO 310
C         NEW DO TERMINUS DENOTED BY NEGATIVE KOST
          KOST=-KOST
          IDOCNT=ICOCNY+1
          IDONUM(IDOCNT)=NMBR
      300 CONTINUE
      310 INSERT=1
          GO TO 50
      315 IFLAG=6
          GO TO 310
C
C         *** SUBROUTINE/FUNCTION/END
      320 ISUBR=1
          IFLAG=6
          GO TO 50
      330 ISUBR=0
          IFLAG=7
          INSCOM=0
          IFNDEF=1
          IF(IDOCNT.EQ.1) GO TO 340
          WRITE(ISRCOT,1060) IDOCNT
          IDOCNT=1
      340 READ(ISRCIN,1010,END=20) JCARD
          IF(JCARD(1).EQ.LDOLAR) GO TO 20
          WRITE(ISRCOT,1015) CRD8,IFLAG
          DO 350 I=1,72
      350 ICARD(I)=JCARD(I)
          GO TO 70
C
C         *** STOP/EXIT/RETURN
      360 IF(ISUBR)50,370,50
      370 WRITE(ISRCOT,1110) LBLANK
          GO TO 50
C
C         *** IF STATEMENT-READ ALL CONTIN CARDS
      380 K=72
          ICALL=0
          DO 420 LCON=1,19
          J=K+1
          K=K+72
      390 READ(ISRCIN,1010,END=10)(ICARD(I),I=J,K)
          IF(ICARD(J).EQ.LC) GO TO 390
      410 IF(ICARD(J+5).EQ.LBLANK) GO TO 430
          IF(ICARD(J+5).EQ.LZERO) GO TO 430
          ICARD(J+5)=LBLANK
      420 CONTINUE
          WRITE(ISRCOT,1070) I,J,K
          GO TO 530
      430 K=K-72
C         ** IF STMT ENDS AT ICARD(K)/SCAN FOR END PARENTHESIS
          IBUFST=K
```

```
          IPAR=0
          DO 440 N=7,K
          IF(ICARD(N).EQ.LPAR) IPAR=IPAR+1
          IF(ICARD(N).NE.LRPAR) GO TO 440
          IPAR=IPAR-1
          IF(IPAR)440,450,440
      440 CONTINUE
          WRITE(ISRCOT,1080) IPAR,N
          GO TO 530
C         ** END PAREN AT ICARD(N)/COPY REST INTO KCARD
      450 NP1=N+1
          IMOVE=7
          DO 460 I=NP1, IBUFST
          IF(ICARD(I).EQ.LBLANK) GO TO 460
          KCARD(IMOVE)=ICARD(I)
          IMOVE=IMOVE+1
          IF(IMOVE.GT.72) GO TO 480
      460 CONTINUE
          DO 470 I=IMOVE,72
      470 KCARD(I)=LBLANK
      480 LASTCO=IMOVE-1
          IFCUST=KOST
          CALL FCLAS(KCARD,KCLASS,KOST,73)
          IF(KOST.LE.O) KOST=1
          IF(KCLASS.EQ.4) GO TO 485
          IF(KCLASS.EQ.1 .OR. KCLASS.EQ.37) GO TO 490
          IF(KCLASS.EQ.5 .OR. KCLASS.EQ.7 .OR.
     *       KCLASS.EQ.9 .AND. ISUBR,EQ,O) ICALL=1
          GO TO 487
C         IF ( ) GO TO . . . DENOTED BY NEGATIVE COST
  485     KOST=-IFCOST
  487     INSERT=1
  490     IF(LCON.GT,1 ,OR. N.GT.44) GO TO 520
C
C         *** NORMAL CASE OF SHORT IFS
          IF(KCLASS,EQ.4) GO TO 500
          IF(KCLASS,EQ.37) GO TO 510
          INDX=MINO(NCTRS,INDX+1)
          WRITE(ISRCOT,1120)(ICARD(I),I=1,N),(LBLANK,I=N,44),INDX,INDX
     *    'IFCOST
          IF(ICALL.EQ.O) GO TO 500
          WRITE(ISRCOT,1130)(ICARD(I),I=1,N),(LBLANK,I=N,44)
      500 IFLAG=5
      510 WRITE(ISRCOT,1015)CRD8,IFLAG,KOST
          GO TO 580
C
C         ** MESSY CASE OF CONTINUED IFS
      520 IF(KCLASS,NE.37) IFLAG=-1
          IF(KCLASS.EQ.4) IFLAG=5
      530 ICNTR=0
C         **GENERATE CONTINUED IF—COUNTERS AND IF—CALLS
      540 KK=0
          DO 570 J=1,LCON
          JJ=KK+1
          KK=KK+72
          IF(J.GT.1)ICARD(JJ+5)=LDIGIT(MINO(J,10))
          IF(KCLASS.EQ.4 .CR. KCLASS.EQ.37) GO TO 560
          IF(KK.LE.N) GO TO 560
          IF(ICNTR.EQ.1) GO TO 550
C         COUNTER HERE
          IF(JJ.LE.N)
     *    WRITE(ISRCOT,1010) (ICARD(I),I=JJ,N),(LBLANK,I=NP1,KK),IFLAG
          INDX=MINO(NCTRS,INDX+1)
          WRITE(ISRCOT,1100) (LBLANK,I=1,5),LSTAR,INDX,INDX,IFCOST
          ICNTR=1
          IFLAG=5
          IF(ICALL.EQ.1) IFLAG=-1
          GO TO 540
      550 IF(ICALL.EQ.O) GO TO 560
C         CALL HERE
          IF(JJ.LE.N)
     *    WRITE(ISRCOT,1010) (ICARD(I),I=JJ,N),(LBLANK,I=NPI,KK),IFLAG
          WRITE(ISRCOT,1110)LSTAR
          ICALL=0
          IFLAG=5
          GO TO 540
      560 WRITE(ISRCOT,1010) (ICARD(I),I=JJ,KK),IFLAG,KOST
          IF(IFLAG.EQ.-1) GO TO 570
          IFLAG=2
          KOST=C
      570 CONTINUE
      580 DO 590 I=1,72
      590 ICARD(I)=ICARD(I+IBUFST)
          GO TO 74
          END
          SUBROUTINE FCLAS(KARD,ITYPE,KOST,NDIM)
          COMMON LASTCO
          INTEGER*4 FRSTWD,SECWD,PCT,RPZ,PKPTR
          INTEGER*2 TWOCHR,DOCHAR,IFCHAR
          LOGICAL*1 PACKED(73),WASEQL,WASCOM,PKNAM(8),BLNK
          LOGICAL*1 TEMP,KARD(NDIM)
          LOGICAL*1 CHECK,LPAR,RPAR,EQUAL,COMMA,QUOTE
          EQUIVALENCE (PACKED(1),FRSTWD,TWOCHR),(PACKED(5),SECWD)
          INTEGER KEYWD(32), TYPE(37),XTRA(37),CUST(37),FACTOR(37)
          INTEGER NAM1,NAM2,FUNC,TION,XIT,HI,BLANK
          INTEGER FUNZ(172),FUNCOS(86)
          LOGICAL*1 BYTE(4)
          INTEGER*4 WORD
          EQUIVALENCE (BYTE(1),WORD)
          DATA NFUNZ/85/, FUNZ/
```

APPENDIX – Continued

```
     *   'ABS ','      ','AIMA','G      ','AINT','      ','ALGA','MA     ','ALOG','10',
     *   'ALOG','      ','AMAX','0      ','AMAX','1     ','AMIN','0      ','AMIN','1 ',
     *   'AMOD','      ','ARCO','S      ','ARSI','N     ','ATAN','2      ','ATAN','  ',
     *   'CABS','      ','CCOS','       ','CDAB','S     ','CDCC','S      ','CDEX','P ',
     *   'CDLO','G     ','CDSI','N      ','CDSQ','RT    ','CEXP','       ','CLOG','  ',
     *   'CMPL','X     ','CONJ','G      ','COS ','      ','COSH','       ','CCTA','N ',
     *   'CSIN','      ','CSQR','T      ','DABS','      ','DARC','OS     ','DARS','IN',
     *   'DATA','N     ','DATA','N2     ','DBLE','      ','DCMP','LX     ','DCON','JG',
     *   'DCOS','H     ','DCCS','       ','DCOT','AN    ','DERF','C      ','DERF','  ',
     *   'DEXP','      ','DFLO','AT     ','DGAM','MA    ','DIM ','       ','DLGA','MA',
     *   'DLOG','10    ','DLOG','       ','DMAX','1     ','DMIN','1      ','DMOD','  ',
     *   'DSIG','N     ','DSIN','H      ','DSIN','      ','DSQR','T      ','DTAN','H ',
     *   'DTAN','      ','ERF ','       ','ERFC','      ','EXP ','       ','FLOA','T ',
     *   'GAMM','A     ','HFIX','       ','IABS','      ','IDIM','       ','IDIN','T ',
     *   'IFIX','      ','INT ','       ','ISIG','N     ','MAXO','       ','MAXI','  ',
     *   'MINO','      ','MINI','       ','MOD ','      ','REAL','       ','SIGN','  ',
     *   'SIN ','      ','SINH','       ','SNGL','      ','SQRT','       ','TAN ','  ',
     *   'TANH','      '/
         DATA FUNCOS/
     *    1,     0,     6,   123,    56,
     *   56,     3,     3,     3,     3,
     *   13,    70,    70,    70,    46,
     *   77,   221,   104,   364,   319,
     *  275,   364,   201,   191,   171,
     *    2,     1,    52,    96,    61,
     *  221,   138,     1,   123,   123,
     *   96,   114,     1,     2,     1,
     *  141,    93,   100,   166,   148,
     *   93,     3,   166,     2,   200,
     *   96,    96,     3,     3,    13,
     *    2,   100,    93,    61,    93,
     *  100,    93,   100,    56,     3,
     *   80,     3,     1,     2,     3,
     *    3,     3,     2,     3,     3,
     *    3,     3,     7,     0,     2,
     *   53,    83,     0,    38,    60,
     *   63/
         INTEGER HASHCO,HASHTB(256)
         DATA HASHCO /1110111666/, HASHTB /
     *       26,17*0,10,11*C,6,2,8*0,18,9*0,20,17*0,16,18*0,5,11*0,7,
     *       0,23,11*0,21,3*0,25,2*0,12,3*0,30,8,14,0,29,9*0,24,10*0,
     *       13,32,4*0,31,7*0,17,11*0,9,15,4*0,3,13*0,4,15*0,22,0,11,
     *       0,19,8*0,27,24*0,1,28,5*0/
         DATA KEYWD / 'ASSI','BACK','BLOC','CALL','CCMM','COMP','CONT',
     2   'DATA','DIME','DOUB','END','ENDF','ENTR','EQUI','EXTE',
     3   'FORM','FUNC','GOTO','IMPL','INTE','LUGI','NAME','PAUS',
     4   'PRIN','PUNC','READ','REAL','RETU','REWI','STOP','SUBR',
     5   'WRIT'/
         DATA COST /2,20,0,4,0,0,0,0,0,0,0,20,6,0,0,0,6,1,0,0,0,0,
     2       20,500,500,500,0,2,20,0,6,500,2,1,-3,0,0/
         DATA TYPE /10,11,34,6,23,29,12,32,24,28,21,13,22,25,31,33,
     2       20,4,38,27,30,36,8,14,15,16,26,9,17,7,19,18,2,3,3,1,5/
         DATA FACTOR/3*0,1,8*0,2,3*0,2,6*0,3*2,4*0,2*2,0,3*1,0/
         DATA XTRA/3*0,—1,5*0,15,9*0,7,7,5*0,4,10*0/
         DATA DUCHAR,IFCHAR,BLANK,LPAR,RPAR,EQUAL,COMMA,QUOTE,BLNK,
     2   FUNC,TION,XIT /'DO','IF',' ','(',')','=',',',
     3   '''',' ','FUNC','TICN','EXIT'/
         EQUIVALENCE (NAM1,PKNAM(1)),(NAM2,PKNAM(5))
C                                         + (    *)    - /     ,     =
         INTEGER OPCOST(64) /13*0,1,1,13*0,5,0,2*0,1,7,9*0,2,18*0,1,0/
C
CC       ***** THIS ROUTINE CLASSIFIES STATEMENTS AS FOLLOWS *****
C         1 ARITHMETIC*       11 BACKSPACE       21 END              31 EXTERNAL
C         2 DO*               12 CONTINUE        22 ENTRY            32 CATA
C         3 IF*               13 ENDFILE         23 COMMON           33 FORMAT
C         4 GO TO             14 PRINT           24 DIMENSION        34 BLOCK DATA
C         5 CALL EXIT*        15 PUNCH           25 EQUIVALENCE      35 UNUSED
C         6 CALL              16 READ            26 REAL             36 NAMELIST
C         7 STOP              17 REWIND          27 INTEGER          37 JUNK
C         8 PAUSE             18 WRITE           28 DOUBLE PREC      38 IMPLICIT
C         9 RETURN            19 SUBROUTINE      29 COMPLEX
C        10 ASSIGN            20 FUNCTION        30 LOGICAL
C           * = => NOT DETERMINED BY KEYWORD ALONE
C
         RPZ=0
         KOST=0
         PCT=0
         LASTOP=0
         PKPTR=0
         FRSTWD= BLANK
         WASEQL= .FALSE.
         WASCOM= .FALSE.
C
C        *** LOUP 10/87 SCANS CARD ***
C
         KK= 7
   10    IF (KARD(KK).EQ.BLNK) GO TO 100
   20    TEMP= KARD(KK)
         IF (TEMP.GT.127) GO TO 90
         IF (TEMP.NE.LPAK) GO TO 30
         PCT= PCT+1
C
C        ** IF LASTOP.NE.PKPTR, SEARCH FOR FUNCTION
         IF(LASTOP.EQ.PKPTR) GO TO 80
         ASSIGN 80 TO NBACK
         GO TO 260
   30    IF(TEMP.NE.RPAR) GO TO 40
         PCT= PCT-1
         IF(.NOT.WASEQL .AND. PCT.EQ.0 .AND. RPZ.EQ.0) RPZ=PKPTR+1
         GO TO 80
   40    IF (TEMP.NE.QUOTE) GO TO 60
C
C        ** SCAN OVER CHARACTER STRINGS
         IF (KK.GE.LASTCO) GO TO 120
         KK1=KK+1
         DO 50 KK=KK1,LASTCO
         TEMP=KARD(KK)
         IF (TEMP.EQ.QUOTE) GO TO 90
   50    CONTINUE
```

APPENDIX—Continued

```
      GO TO 120
   60 IF (PCT,NE.0) GO TO 80
      IF (TEMP.NE.EQUAL) GO TO 70
      WASEQL=.TRUE.
      GO TO 80
   70 IF (WASEQL.AND.TEMP.EQ.COMMA) WASCOM=.TRUE.
C
C     ** NOW ADD COST OF OPERATOR
   80 LASTOP=PKPTR+1
      KOST=KOST+OPCOST(TEMP—63)
C
C     ** EACH NON-BLANK GETS PACKED
   90 IF(PKPTR.EQ.RPZ) CHECK=TEMP
      PKPTR=PKPTR+1
      PACKED(PKPTR)=TEMP
  100 KK=KK+1
      IF(KK-LASTCO) 10,10,120
C
C     *** NOW CLASSIFY STATEMENT ***
C
  120 IF (.NOT.WASCOM) GO TO 130
C     ** A DO STATEMENT, OR ELSE AN ERROR
      IF (TWOCHR,NE,DOCHAR) GO TO 210
      J=33
      GO TO 160
C     ** NOW CHECK FOR IF
  130 IF(TWOCHR.NE.IFCHAR) GO TO 140
      J=34
      IF(RPZ.NE.0 .AND. CHECK,NE.EQUAL) GO TO 160
      IF(PCT.NE.0 .AND. .NOT.WASEQL) GO TO 160
  140 IF(.NOT.WASEQL) GO TO 150
C     ** ARITHMETIC STATEMENT
      J=36
      GO TO 160
C
C     ** WE CAN NOW CLASSIFY BY THE FIRST FOUR CHARS OF KEYWORD
  150 CONTINUE
      WORD=FRSTWD*HASHCO
      J=HASHTB(BYTE(1)+1)
      IF (J.EQ.0) GO TO 210
      IF (FRSTWD.NE.KEYWD(J)) GO TO 210
  160 IF (XTRA(J)) 170,180,190
C     ** CALL, MAYBE A CALL EXIT
  170 IF (PKPTR.EQ.8.AND.SECWD.EQ.XIT) J=37
C
C     ** ASSESS COST BY CLASSIFICATION
  180 ITYPE=TYPE(J)
      KOST=KOST*FACTOR(J)+COST(J)
      RETURN
C
C     ** CHECK FOR <TYPE> FUNCTION
  190 N=XTRA(J)
      IF (PKPTR.LE.N+8) GO TO 180
      DO 200 I=1,8
  200 PKNAM(I)=PACKED(N+I)
      IF(NAM1.EQ.FUNC.AND.NAM2.EQ.TION) J=17
      GO TO 180
  210 ITYPE=37
      RETURN
C
C     *** ENTRY FOR FINDING COST OF CONTINUATION CARDS ***
C
      ENTRY FCOST(KARD,KOST,NDIM)
      PKPTR=0
      LASTOP=0
      KOST=0
      KK=7
  220 CONTINUE
      IF(KARD(KK).EQ.BLNK) GO TO 250
      TEMP=KARD(KK)
      IF(TEMP.GT127) GO TO 240
      KOST=KOST+OPCOST(TEMP—63)
      IF(TEMP.NE.LPAR.OR.LASTOP.EQ.PKPTR) GO TO 230
      ASSIGN 230 TO NBACK
      GO TO 260
  230 LASTOP=PKPTR+1
  240 PKPTR=PKPTR+1
      PACKED(PKPTR)=TEMP
  250 KK=KK+1
      IF (KK,LE.LASTCC) GO TO 220
      RETURN
C
C     ** SEARCH FOR FUNCTIONS AND ADD APPROPRIATE COST
  260 NAM1=BLANK
      NAM2=BLANK
      NSIZ=PKPTR—LASTOP
      IF (NSIZ.LE.2.OR.NSIZ.GT6) GO TO NBACK,(80,230)
      DU 270 I=1,NSIZ
  270 PKNAM(I)=PACKED(LASTOP+I)
C     BINARY SEARCH FOR NAME
      LO=0
      HI=NFUNZ+1
  280 MID—(HI+LO)/2
      IF (NAM1-FUNZ(2*MID—1)) 290,320.300
  290 HI=MID
      GO TO 310
  300 LU=MID
  310 IF(LO+1.LT.HI) GO TO 280
      GO TO NBACK,(80,230)
C     CHECK SECOND PART OF FUNCTION NAME
  320 IF(NAM2—FUNZ(2*MID)) 290,330,300
C     CHARGE FOR FUNCTION FOUND IN TABLE
  330 KOST=KOST+FUNCOS(MID)
      GO TO NBACK,(80,230)
      END
      SUBROUTINE K0UNT1
      COMMON /K0UNT2/ K0UNT3,K0UNT5(2000)
      REAL*8, RTNAME(50),MAIN/'MAIN'/,CARD(9),NAME,BLANK/' '/
      REAL, SUBS(50),PC(50)
```

APPENDIX – Continued

```
                    DIMENSION, IXDO(22),IVAR( 3)
                    LOGICAL*1 LCARD(72),LCONT(13),LABEL(5),LNAME(8)
                    EQUIVALENCE, (CARD(1),LCARD(1)),(NAME,LNAME(1))
                    DATA LCONT/' ','C','O','N','T','I','N','O','E','F','S','(','*'/
         1000       FORMAT(1X,9A8,3112)
         1010       FORMAT(9A8,2X,I2,I4)
         1020       FORMAT('1     STATEMENTS',T32,'*** FETE 360 VERSION 2 ***',
               *    T76,'EXECUTIONS',T94,'TIME',T106,'TRUE',T124,'PAGE',I3//)
         1030       FORMAT(/)
         1040       FORMAT(T30,A8,T45,F12.0,T56,F12.1)
         1060       FORMAT('1 *** PROGRAM SUMMARY:',T30,'ROUTINE',
               *     T52,'TIME',T63,'PERCENT'/)
 C                  *** UNIT 15 IS PASSED DATA FILE
                    LDAT=15
                    ISYSOT=6
                    IRTN=0
                    NAME=MAIN
                    ISUBTL=0
                    TOTAL=0,0
                    IDO=1
                    LABSAV=0
                    LFIRST=1
                    NLINES=58
                    IPAGE=0
                    IT=1
                    GO TO 200
 C
 C                  *** READ CARD AND TAKE SPECIAL ACTIONS
           20       LINE=LINE+1
                    ISUBTL=ISUBTL+KOST
                    IF(LINE-NLINES)40,40,200
           40       READ(LDAT,1010) CARD,IFLAG,KOST
                    IF(IFLAG) 40,45,50
           45       LEXEC=0
                    KOST=0
                    IF(K0UNT3.EQ.0) GO TO 40
           46       WRITE(ISYSOT,1000) CARD
                    GO TO 20
           50       IF(LABSAV.EQ.1) GO TO 320
           60       GO TO (110,240,210,230,150,400,90,250,90),IFLAG
 C
 C                  ** END STMT HERE
           90       IEXEC=0
                    LFIRST=1
                    IT IT+1
                    WRITE(ISYSOT,1000) CARD
                    IF(NAME.EQ.BLANK) GO TO 95
                    IRTN=IRTN+1
                    RTNAME(IRTN)=NAME
                    SUBS(IRTN)=ISUBTL
                    TOTAL=TOTAL+SUBS(IRTN)
    95              ISUBTL=0
                    NAME    MAIN
                    IF(IFLAG.EQ.9) GO TO 340
                    GO TO 200
 C
 C                  **ENTRY STMT
          100       IT=IT+1
                    LINE=LINE+2
                    IF(LINE.LT.NLINES) WRITE(ISYSOT,1030)
                    LFIRST=1
 C
 C                  *** PRINT EXECUTABLES WITH EXECS, COST
          110       LEXEC=1
                    IEXEC=K0UNT5(IT)
          120       CONTINUE
          130       KOST=KOST*IEXEC
          140       WRITE(ISYSOT,1000)CARD,IEXEC,KOST
                    GO TO 20
 C
 C                  *** IFS PRINTED WITH TRUE COUNT
   150              KI=KOST
                    IF(KOST.LT.0) GO TO 160
                    IEXEC=K0UNT5(IT-1)
                    ITRUE=K0UNT5(IT)
                    GO TO 170
   160              IEXEC=K0UNT5(IT)
                    ITRUE=IEXEC-K0UNT5(IT+1)
                    IFCOST=-KOST
                    KOST=1
          170       KOST=1EXEC*IFCOST+ITRUE*KOST
                    WRITE(ISYSOT,1000)CARD,IEXEC,KOST,ITRUE
                    LEXEC=1
                    IF(KI.GT.C) K0UNT5(IT)=K0UNT5(IT-1)
                    GO TO 20
 C
 C                  *** PAGINATION HANDLED HERE
          200       IPAGE=IPAGE+1
                    LINE=4
                    WRITE(ISYSOT,1020)IPAGE
                    GO TO 40
 C
 C                  *** GATHER DO TALLIES
          210       IF(KOST.GT.0) GO TO 220
                    KOST=-KOST
                    IDO=IDO+1
                    IXDO(IDO)=0
          220       IXDO(IDO)=IXDO(IDO)+K0UNT5(IT+1)-K0UNT5(IT)
                    GO TO 110
 C
 C                  *** TALLY EXEC OF DO-ENDS
          230       IEXEC=IXDO(IDO)+K0UNT5(IT+1)
                    IDO=IDO-1
                    GO TO 120
 C
 C                  *** CONTINUATION CARDS
          240       IF(LEXEC.DQ.0) GO TO 45
                    IF(KOST.EQ.0) GO TO 46
                    GO TO 130
 C
```

APPENDIX – Continued

```
C          ***COUNTER CARDS—LABELED
      250  IF(KOST.GE.0) GO TO 270
           DO 260 I=1,5
      260  LABEL(I)=LCARD(I)
           LABSAV=1
C          UNLABELED
      270  IT=IT+1—LFIRTS
           IFCOST=KUST
           LFIRST=0
           IF(KOST.LT.—1) GO TO 280
           GO TO 40
C
C          ** RECREATE A DELETED CONTINUE STATEMENT
      280  DO 290 I=1,5
      290  LCARD(I)=LABEL(I)
           LABSAV=0
           DO 300 I=1,9
      300  LCARD(I+5)=LCONT(I)
           DO 310 I=15,35
      310  LCARD(I)=LCONT(1)
           IFLAG=1
           GO TO 60
C
C          ** REPLACE STOLEN LABELS
      320  IF(IFLAG.EQ.8) GO TO 270
           DO 330 I=1,5
      330  LCARD(I)=LABEL(I)
           LABSAV=0
           GO TO 60
C
C          *** SAVE ROUTINE NAMES FOR SUMMARY
C          CLASSIFY BY FIRST LETTER F,S,E OR <TYPE>F
400        DO 410 I=7,72
           IF(LCARD(I).EQ.LCONT(1)) GO TO 410
           ITYP=1
           IF(LCARD(I).EQ.LCONT(9)) ITYP=2
           IF(LCARD(I).EQ.LCONT(10)) ITYP=3
           IF(LCARD(I).EQ.LCONT(11)) ITYP=4
           GO TO (415,100,420,440), TYP1
      410  CONTINUE
           GO TO 110
           SCAN OVER <TYPE>
415        IPTR=I+1
           DO 416 I=IPTR,72
           IF(LCARD(I).EQ.LCONT(10)) GO TO 420
416        CONTINUE
C          MUST HAVE BEEN BLOCK DATA STATEMENT
           NAME=BLANK
           GO TO 45
C          FIND FUNCTION NAME
      420  IPTR=I+1
           NUM=0
           DO 430 I=IPTR,72
           IF(LCARD(I).EQ.LCONT(4)) NUM=NUM+1
           IF(NUM.EQ.2) GO TO 460
      430  CONTINUE
C          FIND SUBROUTINE NAME
      440  IPTR=I+1
           DO 450 I=IPTR,72
           IF(LCARD(I).EQ.LCONT(9)) GO TO 460
      450  CONTINUE
C          PACK THE NAME
      460  IPTR=I+1
           NAME=BLANK
           NUM=0
           DO 470 I=IPTR,72
           IF(LCARD(I).EQ.LCONT(1)) GO TO 470
           IF(LCARD(I).EQ.LCONT(12)) GO TO 110
           IF(LCARD(I).EQ.LCONT(13)) GO TO 110
           NUM=NUM+1
           IF(NUM.LE.8) LNAME(NUM)=LCARD(I)
      470  CONTINUE
           GO TO 110
C
C          *** PRINT OUT SUMMARY BY ROUTINES
      340  WRITE(ISYSOT,1060)
           TOTAL=TOTAL/100.
           DO 350 I=1,IRTN
      350  PC(I)=SUBS(I)/TOTAL
           WRITE(ISYSOT,1040) (RTNAME(I),SUBS(I),PC(I),I=1,IRTN)
           REWIND LDAT
           RETURN
           END
```

What is claimed is:

1. A software monitoring and performance evaluation program for use in a computer comprising the steps of: editing a source file by inserting counters and flags in said source file for providing a modified source file; executing said modified source file wherein said counters are incremented; and analyzing the executable statements of said source file and the incremented values of said counters for providing a printout of each of said executable statements in correlation with the number of executions of each of said executable statements which occur in the execution of said modified source file.

2. A software monitoring and performance evaluation program according to claim 1 wherein certain ones of said flags provide the cost of executing each of said executable statements and said program further comprises the steps of calculating and printing out in correlation with said printout of each of said executable statements the total approximate cost of executing each of said executable statements which occurs in the execution of said modified source file.

3. A software monitoring and performance evaluation program according to claim 1 wherein certain of said executable statements comprise logical IF statements and wherein said program further comprises calculating and printing out in correlation with each of said logical IF statements the number of times said logical IF statements are true during the execution of said modified source file.

4. A software monitoring and performance evaluation program according to claim 1 wherein said step of editing said source file comprises: a first editing step of reading a first input card image; determining if said first input card image is a comment; if not a comment, determining if said first input card image is a continuation card image; if not a continuation card image, determining the statement type; determining if a declaration is needed for counters; if a declaration is not needed for counters, determining if a counter is needed; if a counter is not needed; further processing said statements; printing out a modified card image with counters and flags; and returning to said first editing step and reading a second input card image.

5. A software monitoring and performance evaluation program according to claim 4 wherein said step of editing said source file further comprises: reading a second input card image if said first input card image is a comment; determining the cost of said continuation card image if said first input card image was not a comment but was a continuation card image; and printing out a modified card image with counters and flags.

6. A software monitoring and performance evaluation program according to claim 5 wherein said step of editing said source file further comprises: if said second input card image is not a comment, determining whether said second input card image is a continuation card; if said second input card image is not a continuation card, determining statement type; determining if a declaration is needed for counters; if a declaration is needed for counters, printing out the declaration for counters; determining if a counter is needed; if a counter is needed, printing out of the counter with label if necessary; further processing said statements; printing out a modified card image with counters and flag; and returning to said first editing step and reading a third input card image.

7. A software monitoring and performance evaluation program according to claim 1 wherein said step of analyzing said executable statements of said source file and the incremented values of said counters comprises: a first analyzing step of reading a first card image from said modified source file; checking the flags and determining if special processing is needed; if special processing is not needed, printing out the statement; determining whether there are any more card images in said modified source; if there are more card images in said modified source, returning to said first analyzing step and reading a second card image from said modified source.

8. A software monitoring and performance evaluation program according to claim 7 wherein said step of analyzing further comprises: checking said second card image from said modified source to determine if special processing is needed, if special processing is needed, perform said special processing for each type of flag; determining whether a statement was a logical IF; if a statement was not a logical IF, printing out statements with numbers of executions and approximate costs; determining whether there are any more card images in said modified source; if there are more card images in said modified source returning to said first analyzing step and reading a third card image from said modified source.

9. A software monitoring and performance evaluation program according to claim 8 wherein said step of analyzing further comprises: checking flags of said third card image to determine if special processing is needed; if special processing is needed, perform said special processing for each type of flag; determining whether statement on said third card image is a logical If; if a statement on said third card image is a locigal If, printing out said statement with the number of executions and approximate cost and number of true cases; determining if there are any more card images in said modified source; if there are no more card images in said modified source, printing out a summary of timings for each routine.

* * * * *